United States Patent [19]

Isii

[11] Patent Number: 4,893,039
[45] Date of Patent: Jan. 9, 1990

[54] WINDSHIELD WIPER MOTOR
[75] Inventor: Yosinori Isii, Kanagawa, Japan
[73] Assignee: Jidosha Denki Kogyo Kabushiki Kaisha, Kanagawa, Japan
[21] Appl. No.: 204,806
[22] Filed: Jun. 10, 1988
[30] Foreign Application Priority Data
  Jun. 12, 1987 [JP] Japan .............................. 62-89606[U]
[51] Int. Cl.$^4$ ................................................. H02K 5/00
[52] U.S. Cl. ......................................... 310/89; 310/88
[58] Field of Search ............................. 310/83, 88, 89
[56] References Cited
U.S. PATENT DOCUMENTS
  4,554,844 11/1985 Hamano ............................ 74/606 R
  4,683,771 8/1987 Sogo et al. ........................ 74/606 R Primary Examiner—Patrick R. Salce
Assistant Examiner—Judson H. Jones
Attorney, Agent, or Firm—Sughrue, Mion, Zinn, Macpeak & Seas

[57] ABSTRACT

A windshield wiper motor having a motor casing and a reduction gear casing is provided with a crooked air passage between the casings which is provided with a breather hole at a position that neither coincides nor overlaps with a projection of the respective openings of the passage into the gear casing and motor casing, so that it is possible to perform a breathing action even if lubricating oil penetrates into the air passage through the opening since the oil will be prevented from entering and clogging the breather hole.

2 Claims, 3 Drawing Sheets

WINDSHIELD WIPER MOTOR

BACKGROUND OF THE INVENTION

1. Field of the Invention

This invention relates to a windshield wiper motor used for an electric windshield wiper assembly which wipes off raindrops and the like for example from windshield glass of an automobile with the wiper blade so as not disturb the driving view, and in particular to a windshield wiper motor having a breathing structure possible to breathe smoothly between the inside and outside thereof.

2. Description of Applicant's Unpublished Earlier Construction

Heretofore, there ha been such a windshield wiper motor as shown in FIGS. 6 and 7 for example.

Namely, in a windshield wiper motor 100 shown in the figures, numeral 101 is a motor part housing a rotor 102 possible to rotate in a normal and reverse direction in a motor case 103 with an opening at the end. Numeral 104 is a gear part, outside gear parts 106a and 107a of intermediate gears 106 and 107 are engaged with a worm part 102a of rotor 102 extended from said motor part 101 to the inside of a gear case 105 through a piercing hole 105a provided at an end of the gear case 105, and an output gear wheel 108 is engaged with pinion parts 106b and 107b of said intermediate gears 106 and 107, an output shaft 109 fixed to the output gear wheel 108 is made into an output and extending to the outside of the gear case 105.

The motor part 101 and the gear part 104 are connected at respective ends of the motor case 103 and the gear case 105, and a through hole 105b communicating with the inside of the gear case 105 and the inside of the motor part 101 at the end of the gear case 105 on the motor part 101 side makes the gear part 104 and the motor part 101 into the communicating state as shown in FIG. 7.

Numeral 110 is a breather, disposed in an air hole 105d pierced through in a part of a bottom plate 105c of the gear case 105 and connecting the upper and lower sides of the bottom plate 105c in FIG. 6, in the downwardly pressed state as shown in FIG. 6. The breather 110 is provided with a shell shaped part 110a at the lower side thereof in FIG. 6, a breather hole 111 is formed which communicates crookedly with the inside and the outside of the gear case 105 through the shell shaped part 110a. So that, the penetration of water or the like into the inside of the gear case 105 or motor case 103 owing to the breathing action caused by generation of heat accompanying the working and stopping of the windshield wiper motor is prevented.

However, in the windshield wiper motor 100 as described above, for example on occasion of air inhalation in the breathing action caused by heat generation, lubricating oil applied on gears in the gear case 105 sometimes penetrates into the through hole 105b provided in the gear case 105. There is a problem that the breathing action becomes impossible in the case the through hole 105b is closed with said lubricating oil. Also in the breather 110 provided in the bottom plate 105c of the gear case 105, lubricating oil applied on gears in the gear case 105 sometimes penetrates into the breather hole 111, there is a problem that the breathing action becomes impossible similar to the case of through hole 105b.

SUMMARY OF THE INVENTION

Therefore, this invention is considered in order to solve the aforementioned problems and is made as a result of particular considerations on the structure with object of providing a windshield wiper motor equipped with a breather hole without the penetration of lubricating oil applied on gears in the gear case and capable to make smooth breathing action continuously.

In order to accomplish the aforementioned object, the windshield wiper motor according to this invention has structural features that in a windshield wiper motor equipped with a breather hole making the inside of a gear case housing a gear part and the inside of a motor case housing a motor part communicate with the outside thereof, a crooked air passage communicating with an opening in said gear part side and an opening in said motor part side in provided between said gear and motor part, and said air passage in provided with said breather hole at a position that neither concides nor overlaps with projection of said opening in the gear part side or projection of said opening in the motor part side in the opening direction.

DESCRIPTION OF THE PREFERRED EMBODIMENT

Figure 1:
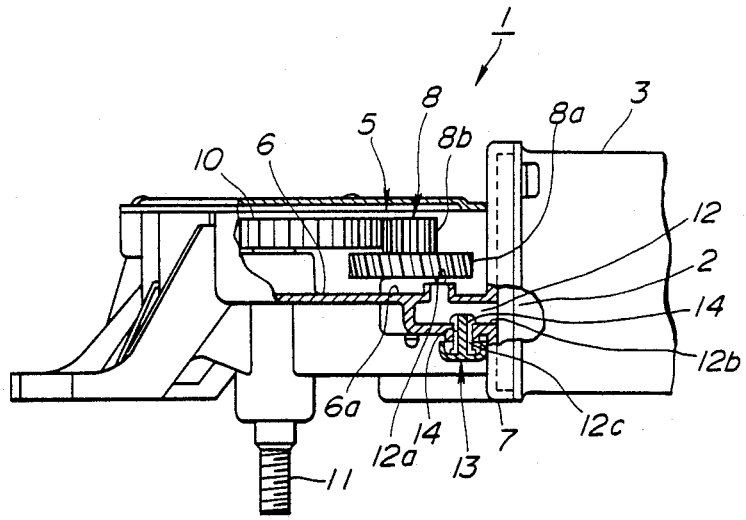
FIG. 1 is a side view partly in section of an embodiment of the windshield wiper motor according to this invention.
Figure 2:
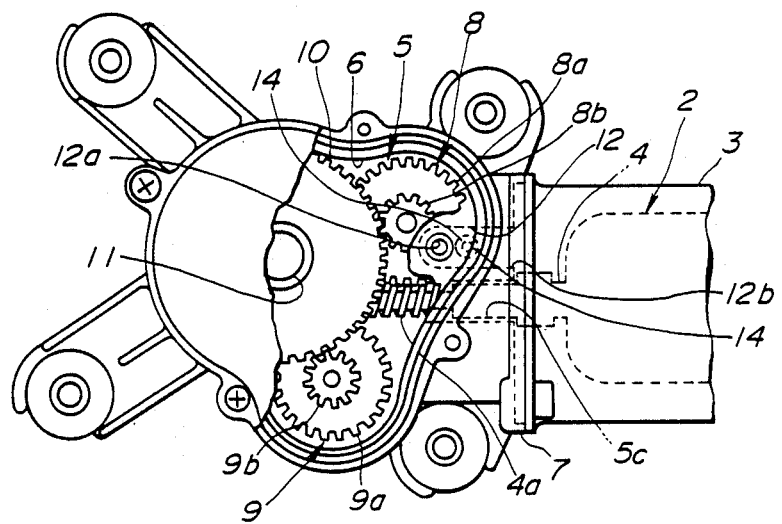
FIG. 2 is a top view partly in section of the windshield wiper motor shown in FIG. 1.
Figure 3:
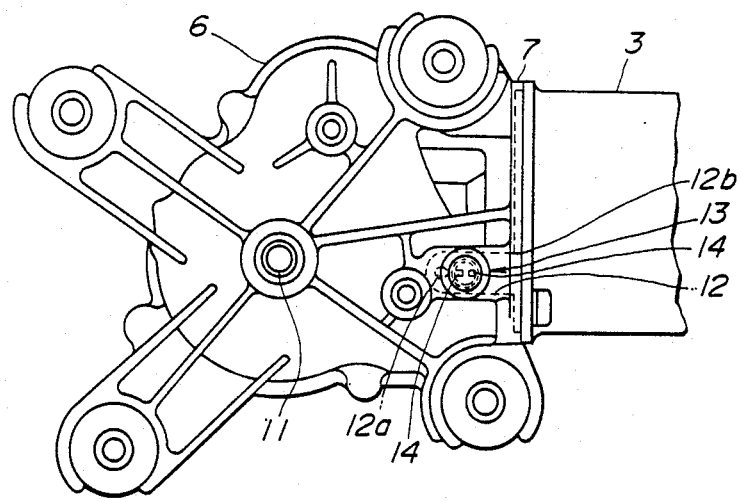
FIG. 3 is a bottom view of the windshield wiper motor shown in FIG. 1.

An embodiment of the windshield wiper motor according to this invention will be described below on basis of FIG. 1 to FIG. 5.

Namely, in a windshield wiper motor 1 showing in figures, numeral 2 is a motor part. A rotor 4 (refer to FIG. 2) rotatable in a normal and reverse direction is housed in a motor case 3 provided with an opening at the end, and an end portion of the rotor 4 is extended from the opening at the end of the motor case 3, and a worm part 4a is formed at the extended end portion.

Numeral 5 is a gear part. A gear case 6 made up of flat bottomed and roughly triangular vessel and an end-bracket 7 for connecting with said motor case 3 at the right side portion in FIG. 1 are formed in a body, and the worm part 4a of the rotor 4 equipped in said motor part 2 is extended to the inside of the gear case 6 through a piercing hole 5c pierced in the end-bracket 7 in the horizontal direction in FIG. 2. Each of outside gear parts 8a and 9a of intermediate gears 8 and 9 is engaged with said worm part 4a, then the rotation of the rotor 4 is transfered and reduced by means of engaging an output gear 10 with respective pinions 8b and 9b of said intermediate gears 8 and 9. The output gear 10 is fixed to an output shaft 11, an end portion of the output shaft 11 is made into the output extending to the outside of the gear case 6.

Hereupon, in this embodiment, the end-bracket 7 of the gear part 5 is provided with an air passage 12, which communicates crookedly with the inside of the gear case 6 and the motor case 3.

Namely, on a part of the bottom plate 6 of the gear case 6, under the intermediate gear 8 in FIG. 1 in this embodiment, a cylindrical shaped opening 12a of the gear part side is provided which communicates with the inside of the gear case 6 protruding upward a little from said bottom plate 6a in FIG. 1, and maintaining a small gap between outside gear part 8a of the intermediate gear 8 and itself.

The end-bracket 7 is provided with an opening 12b on the motor part side communicating with the inside of the motor case 3 at the right side thereof in FIG. 1, and the crooked air passage 12 is equipped, which communicates with said opening 12a in the gear part side and the opening 12b in the motor part side within angle of approximately 90° in this embodiment.

And, an air hole 12c is equipped in the position that neither coincides nor overlaps with either a projection of the opening 12a in said gear part side in the opening direction or a projection of the opening 12b in said motor part side in the opening direction, namely in this embodiment, in the position near to the opening 12b in the motor part 2 side offset from the crooked part of said air passage 12 in FIG. 1.

Figure 5:
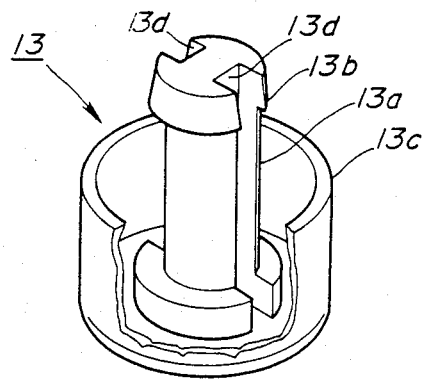
FIG. 5 is a perspective outside view partly in section of the breather in windshield wiper motor according to this invention.
Figure 6:
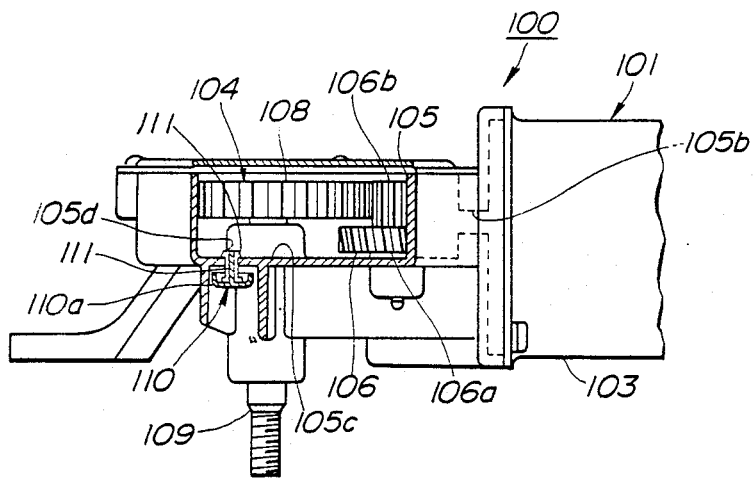
FIG. 6 is a side view partly in section of applicant's previous windshield wiper motor.
Figure 7:
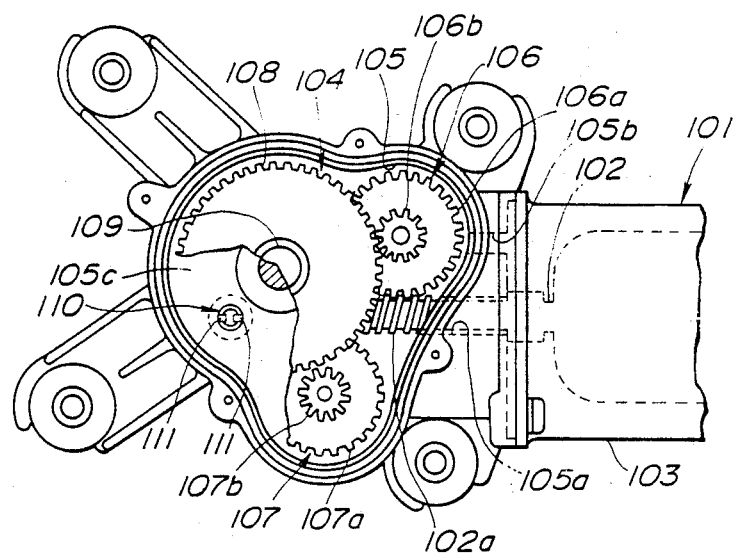
FIG. 7 is a top view partly in section of the windshield wiper motor shown in FIG. 6.

Hereupon, numeral 13 is a breather disposed in the air hole 12c, as shown in FIGS. 5 and 6. A vertical long leg 13a is provided with a hooking projection 13b at the upper end part, and with a shell shaped part 13c covering the circumference of said leg 13a for nearly half the length of it at the lower end part thereof. And said leg 13a is provided with notching grooves 13d and 13d cutting off opposite side wall portions from the upper end part to the lower end part there of in the longitudinal direction.

Figure 4:
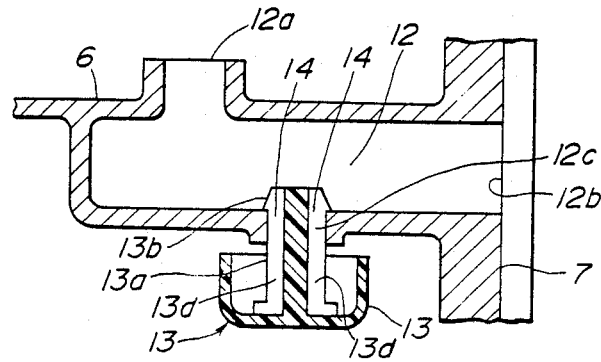
FIG. 4 is a vertical sectional view of the neighborhood of breather hole in the windshield wiper motor shown in FIG. 1.

In brief, as showing in FIG. 4, the breather 13 is attached to the gear case 6 by pushing the hooking projection 13b of the breather 13 from the lower side of the air hole 12c of the air passage 12 in the figure, and forms a breather hole 14 communicating with the outside, between notching groove 13d of the leg 13a and air hole 12c.

Thus the inside of the gear case 6 and the inside of the motor case 3 are made into communicating state with each other by the air passage 12, and are made into communicating state with the outside by the breather hole 14.

Consequently, for example, even if lubricating oil applied to the gear parts provided in the gear case 6 penetrates into the air passage 12 through the opening 12a in the gear part side, the air passage 12 and the breather hole 14 are never closed so easily and the breathing action becomes possible to be performed smoothly, because said opening 12a in the gear part side neither concides nor overlaps with projection of the breather hole 14 or the opening 12b in the motor part side in the opening direction respectively.

As mentioned above, the windshield wiper motor according to this invention has structure that in a windshield wiper motor equipped with a breather hole making the inside of a gear case housing a gear part and the inside of a motor case housing a motor part communicate with the outside thereof, a crooked air passage communicating with an opening in said gear part side and an opening in said motor part side is provided between said gear and motor part, and said air passage is provided with said breather hole at a position that neither concides nor overlaps with projection of said opening in the gear part side or projection of said opening in the motor part side in the opening direction. Therefore, an excellent effect is obtained that the breathing action can be performed smoothly because the penetration of lubricating oil becomes extremely rare as compared with conventional windshield wiper motor and it is rare to interfere with the breathing action of the windshield wiper motor.

What is claimed is:

1. A windshield wiper motor assembly comprising a motor casing having motor means therein,
   a gear casing connected to said motor casing and having reduction gear means therein operatively connected to said motor means,
   a crooked air passage extending between said motor casing and said gear casing with an opening at each end thereof in communication with each casing and
   breather means located in said passage to provide communication between said passage and the atmosphere outside of said casings, wherein said breather means is provided with a hole offset from said openings at opposite ends of said passage in a position preventing straight line communication between said openings and said hole and includes a substantially T-shaped member having a leg portion and a cap portion with said leg portion disposed in said hole and having at least one groove extending along the length thereof.

2. A windshield wiper motor assembly as set forth in claim 1, wherein said air passage has a substantially L-shaped configuration and said hole of said breather means has an axis intersecting and perpendicular to one leg of said L-shaped passage and offset and parallel to another leg of said L-shaped passage.

* * * * *